(12) United States Patent
Munger

(10) Patent No.: US 6,466,158 B2
(45) Date of Patent: Oct. 15, 2002

(54) IDENTIFYING CLOSELY CLUSTERED MOVING TARGETS

(75) Inventor: Marcus Lowell Munger, Boulder, CO (US)

(73) Assignee: Lockheed Martin Corp., Philadelphia, PA (US)

(*) Notice: Subject to any disclaimer, the term of this patent is extended or adjusted under 35 U.S.C. 154(b) by 0 days.

(21) Appl. No.: 09/733,152

(22) Filed: Dec. 8, 2000

(65) Prior Publication Data

US 2002/0113728 A1 Aug. 22, 2002

(51) Int. Cl.$^7$ ............................................... G01S 13/00
(52) U.S. Cl. ....................... 342/95; 342/189; 342/195
(58) Field of Search ........................ 342/95, 189, 195, 342/897, 103

(56) References Cited

U.S. PATENT DOCUMENTS

| | | | |
|---|---|---|---|
| 4,712,248 A | 12/1987 | Hongo | 382/22 |
| 5,144,316 A * | 9/1992 | Uhlmann et al. | 342/189 |
| 5,309,159 A * | 5/1994 | Shahaf et al. | 342/90 |
| 5,414,643 A * | 5/1995 | Blackman et al. | 364/516 |
| 5,491,645 A * | 2/1996 | Kennedy et al. | 364/516 |
| 5,721,692 A | 2/1998 | Nagaya et al. | 364/516 |
| 6,263,088 B1 * | 7/2001 | Crabtree et al. | 382/103 |
| 6,292,136 B1 * | 9/2001 | Egnell | 342/432 |

OTHER PUBLICATIONS

"Computing the apparent centroid of radar targets," Lee, C.E. Radar Conference, 1996., Proceedings of the 1996 IEEE National, 1996 pp. 166–171.*
"A video image processor for real–time centroid calculation," Cameron, K.; Canaris, J.; Whitaker, S. ASIC Conference and Exhibit, 1992., Proceedings of Fifth Annual IEEE International, 1992. pp. 201–204.*
"Centralized and distributed Kalman filtering in multi–coordinate systems with uncertainties," Hong L. Aerospace and Electronics Conference, 1990. NAECON 1990., Proceedings of the IEEE 1990 National, 1990 pp. 389–394 vol. 1.*

* cited by examiner

Primary Examiner—Thomas H. Tarcza
Assistant Examiner—Brian K. Andrea
(74) Attorney, Agent, or Firm—Carl M. Wright; Allen E. Amgott

(57) ABSTRACT

Individual objects are located according to a coordinate system in time-successive patterns and correlated between patterns. The objects are correlated by assigning identifiers to each in both patterns. The locations are transformed by reorientation to their centroid. The average of the transformed coordinate differences is used to adjust the centroid of the objects in a subsequent pattern and the transformed coordinate differences adjusted for the centroid displacement. A figure of merit is taken as the root-mean-square of the adjusted differences and used to determine which possible combination of correlated objects between two patterns is most likely.

14 Claims, 2 Drawing Sheets

IDENTIFYING CLOSELY CLUSTERED MOVING TARGETS

CROSS-REFERENCE TO RELATED APPLICATIONS

This application is related to copending patent application Ser. No. 09/733,578 filed concurrently herewith.

GOVERNMENT RIGHTS IN THE INVENTION

The United States Government has rights in this invention pursuant to Contract No. F04701-96-C-0044 with the Department of the Air Force.

BACKGROUND OF THE INVENTION

1. Field of the Invention

This invention relates to tracking multiple targets using passive or active sensors. Particularly, it relates to identifying each target in groups where the targets are closely clustered. More particularly, it relates to closely spaced targets which diverge, converge, merge, or split and which may be traveling at varying speeds.

2. Background

To identify targets between observation times (referred to as scans), the targets observed (hits) must be correctly correlated between scans. Multiple target tracking systems are well known in the art and described in the literature, e.g., "Multiple-Target Tracking with Radar Applications" by Samuel S. Blackman (Airtech House, Inc. 1986).

Kalman or batch filters are used as predictor functions to provide accurate tracking parameters. Such predictors, however, fail when the objects being tracked are closely clustered. Furthermore, the accuracy of such predictors depends on the accuracy in position determination. To track the paths of individual targets, it is necessary to determine the continuity of the individual trajectories from one observation time period to the next. When multiple targets are tightly grouped, the predictor functions cannot provide a sufficiently accurate projection due to inadequate target separation and to noise on the measurements used by the predictor. The time interval between observations may be long and the motion of clusters is fast enough that the error in prediction of the target's positions is greater than the separation of the targets in the cluster.

The track determination is more difficult when the locations of the objects are observed for only short time periods separated by long intervals, especially when the objects are moving at a rapid rate.

Object identification in the prior art is directed to recognizing objects moving against a stationary background or to identifying a bounded object of a given shape. These techniques are not applicable to situations where multiple targets are being tracked and the targets can interchange apparent relative positions.

SUMMARY OF THE INVENTION

In accordance with the invention, the tracks of closely spaced objects are maintained by locating the objects in two successive patterns according to a coordinate system. Identifiers are assigned to the objects depending on their location in each pattern. The objects in the successive patterns are then correlated by a procedure that adjusts their position parameters within the patterns relative to a modified origin such as the centroid of their locations. The adjusted position parameters within the second pattern are transformed relative to a displacement of their centroid. The displacement is determined from the differences between all pairs of locations in both patterns. A figure of merit can be derived to aid matching the objects from one pattern to the next.

BRIEF DESCRIPTION OF THE DRAWING

The invention is described in detail by referring to the various figures of the drawing which illustrate specific embodiments of the invention, and wherein like numerals refer to like elements.

DETAILED DESCRIPTION OF THE INVENTION

Figure 1:
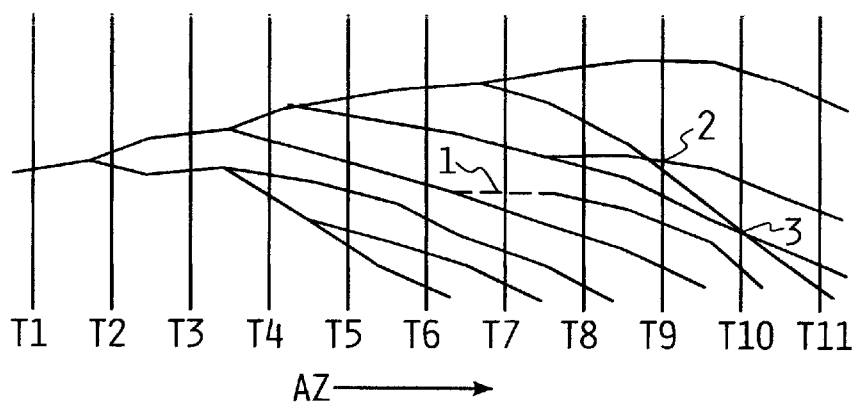
FIG. 1 is an illustration of an example of multiple trajectories of clustered targets.

Closely clustered maneuvering targets in space include fragments of a celestial object such as an asteroid or meteor, or individual re-entry vehicles from a rocket-launched missile. To track the paths of individual targets, it is necessary to determine the continuity of the individual trajectories from one observation time to the next. For example, at a time $T(n)$, several (m) objects are detected in positions $P(n,k)$ where k is the k-th object in the cluster and $k=1,2,\ldots,m(n)$ at time period n. At a subsequent time period, $T(n+1)$, objects of the cluster are observed at positions $P(n+1,j)$ where $j=1,2,\ldots,m(n+1)$. It may not always be the case that $m(n)=m(n+1)$. That is, the number of targets detected at time $T(n+1)$ may be greater or fewer than the number detected at time $T(n)$. Furthermore, $P(n+1,j)$ may not be the same object at time $T(n+1)$ as $P(n,k)$ even though $j=k$. Lack of correlation among objects in the cluster from one time period to another may be caused by track crossover, by failure to detect an object during a time period, or by failure to resolve the objects from one observation to the next. Predictor models using Kalman or batch filters, for example, produce undependable correlations because of the errors in position predictions for the case of closely clustered moving objects. This cross tracking is due principally to the fact that the errors of such predictors are greater than the separation of the closely clustered objects.

Active detectors such as radar provides azimuth, elevation, and range information of a target. They can also supply the rate of change of range (range rate) of the target. This information furnishes a three-dimensional representation of a target in spherical coordinates. These coordinates can be transformed to a three-dimensional orthogonal right-handed system describing a target in terms of x, y, and z vector coordinates.

Passive detectors include infrared sensors and light detectors such as television cameras. Single passive sensors can supply azimuth and elevation information of sensed targets but not range information of the targets. The azimuth and elevation information describe a two-dimensional angular reference system that can be optionally converted to an x and y orthogonal vector system.

In the case of infrared sensors, the source of the radiation detected is often not a point source so that the precise position of a detected object results in smear or a span of possible precise locations over several individual sensors. This adds a further level of complication to the function of tracking individual objects in a cluster. It is well known in the art to ascertain the most probable location of an object in an observation that overlaps several sensor units, e.g., infrared sensors' cells or pixels.

The invention is applicable to three-dimensional tracking such as, for example, when the ranges of the targets are known. The implementation to be described uses two-dimensional vectors of the general form r=xi+yj (Vector quantities are written in bold italic typeface.) Extension to three dimensions will be obvious to those of ordinary skill in the art since it only requires the addition of a third component, i.e., r=xi+yj+zk. (The symbols i,j, and k are the standard notation for the commonly used right-hand orthogonal base unit vectors.) The invention is generally useful in any coordinate system, the only criteria being that in the coordinate system used, the relative motion and error are less than the separation of the targets.

Figure 2:
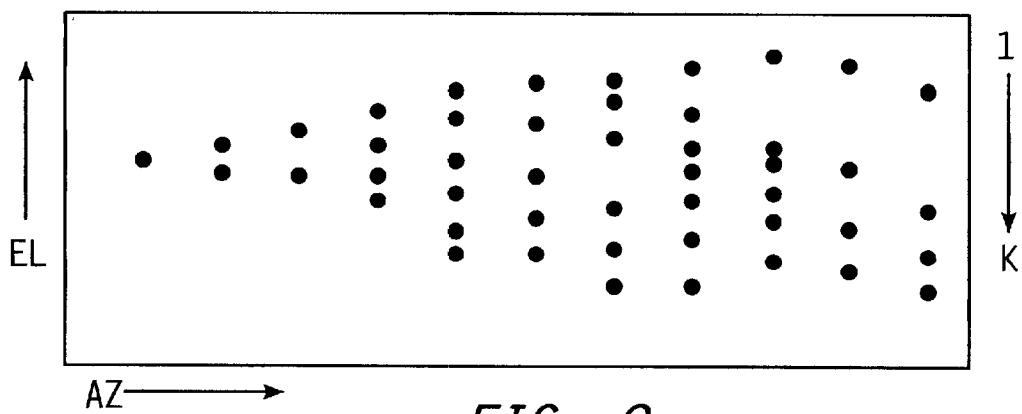
FIG. 2 is a display of the hits (detected targets) according to azimuth and elevation corresponding to the time frames of FIG. 1.

Common illustrative situations are shown in the figures of the drawing. FIG. 1 illustrates one dimension of the measurements for the trajectories of several objects in a cluster. Observation times are delineated by vertical lines labeled T1 through T11. FIG. 2 shows how a display of the sensor detection signals, referred to as hits, might appear at corresponding time periods. The hits in this example are numbered from the top down for each time period. The hit numbers assigned in each time period do not necessarily correspond to the same target as the same hit numbers in other time periods. The hits will be identified as P(n,k) as noted where n is the time period and k is the hit number.

There are some points of interest to be noted. At time period T7, the dotted line path of one trajectory indicates that it is not detected at that time. Therefore, there are only six hits detected at time period T7 although there are actually seven targets. In other words, the trajectory which originated between time period T6 and T7 from a split of P(6,3) does not show up at T7 but appears at T8.

Between time period T8 and T9, the trajectory of hit 3 at time period T8, i.e., P(8,3) has crossed the trajectory of P(8,2) so that P(9,2) at reference numeral 2 was P(8,3) and P(8,2) is P(9,3). This can be written as P(8,3)→P(9,2) and P(8,2)→P(9,3). Another situation is shown at time period T10 at reference numeral 3. The hits P(9,3) and P(9,4) both appear as P(10,3). This can be symbolized as P(9,3)+P(9,4)→P(10,3).

Figure 3:
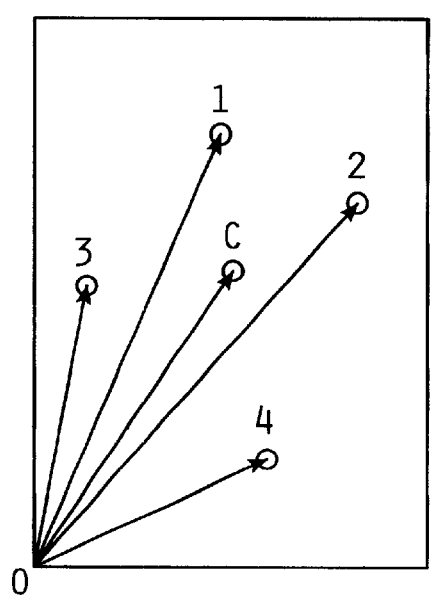
FIG. 3 is an illustration of position vectors of exemplary hits.

These examples demonstrate some of the problem situations that can arise while attempting to track the trajectories of clustered objects, especially when using passive sensors. The situations depicted in FIGS. 1 and 2 are simplified for purposes of explanation. They are based on the assumption that the targets being tracked are on the single dimension having the greatest dispersion and are traveling at velocities that put them all at the same azimuth at the same time. (The time axis can be considered coincident with the azimuth axis.) In actuality, the targets scatter as well as diverge. FIG. 3 illustrates a more realistic display of hits. A scan will usually rapidly sweep out an arc of azimuth (which can vary from a small arc to a complete circle de-pending on the situation) or perform a linear scan in a time-periodic fashion for each scan. This also applies to a system that starts at the target and is sampled periodically. Each configuration of hits is referred to as a snapshot.

Figure 4:
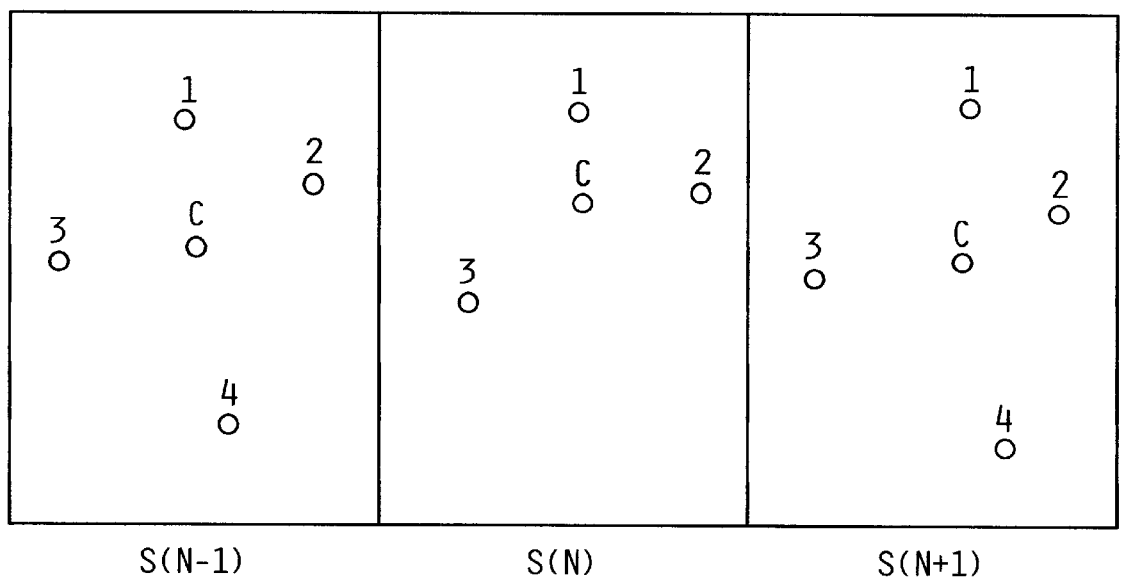
FIG. 4 is an illustration of examples of three successive snapshots showing differing numbers of hits per snapshot.

In FIG. 4, the hits are displayed for three snapshots and are assigned identification numbers. The hits are well separated along the y-axis. Therefore, the points are sorted first along the y-axis. If the hits are expressed in other coordinates such as azimuth and elevation, they may be converted to a rectilinear coordinate system, i.e., Cartesian, before sorting and vice versa. If there is an ambiguity in the y-axis sort, then additional sorts are performed. This process is disclosed in detail in copending patent application Ser. No. 09/733,578. This sorting process is used to put the hits in the previous two snapshots, S(N−1) and S(N−2)—the latter is not shown—into the same order as the snap-shot S(N−1).

FIG. 3 illustrates the terminology used in the following description of the invention. Four hits are shown as well as the centroid C of the hits. The location of each hit and the centroid are expressed as position vectors having as their origin the lower left corner of the snapshot. The position vectors of the hits 1, 2, 3, and 4 are, respectively, $r_1$, $r_2$, $r_3$, and $r_4$. The position vector of the centroid C is r(c) and is found as the average of the position of the hits, i.e., $$r(c) = \frac{r_1 + r_2 + r_3 + r_4}{4}.$$

For r(n)=x(n)i+y(n)j (where the x(n) and y(n) values are the x and y distances from the origin of the nth vector and i and j are unit vectors along the x- and y-axes, respectively). The centroid vector is $$r(c) = \frac{x_1 + x_2 + x_3 + x_4}{4} i + \frac{y_1 + y_2 + y_3 + y_4}{4} j.$$

FIG. 4, three successive snapshots are shown as S(N−1), S(N), and S(N+1). The hits of snapshot S(N−1) are numbered as described in copending application Ser. No. 09/733,578 and their centroid is shown as C. In snapshot S(N−1), there are four hits. In snapshot S(N), there are only three hits, and in snapshot S(N+1) there are again four hits. The objective is to identify correctly the hits from one snapshot to another that correspond to the same targets.

In the case where the number of hits n(j) in the j-th snapshot is fewer than the number of hits n(i) in a preceding i-th snapshot, a procedure for deriving a figure of merit determines which of the possible combinations of n(i) hits most closely matches the no) hits. The steps of the procedure are as follows.

1. The origins of the x,y coordinates of the hits in both snapshots are transformed to the centroid of the snapshot:

$$x'(i,k)=x(i,k)-x(c_i)$$

and $$y'(i,k)=y(i,k)-y(c_i),$$

where x(i,k) is the x component of the k-th hit in the i-th snapshot, y(i,k) is the y component of the k-th hit in the i-th snapshot, $x(c_i)$ is the x component of the centroid in the i-th snapshot, and $y(c_i)$ is the y component of the centroid in the i-th snapshot.

2. The differences between the transformed coordinates of the i-th snapshot and the transformed coordinates of the j-th snapshot are calculated:

$$\Delta x(r,c)=x'(i,f[r])-x'(j,c)$$

and $$\Delta y(r,c) = y'(i, f[r]) - y'(j,c),$$

where
r=1, 2, . . . , n(i),
f[r] is the r-th combination of the possible $$\binom{n(i)}{n(j)}$$

combinations of the x'(i,•)
or y'(i,•) values (which can be found using a table-lookup approach, for instance, or the binomial theorem), and c=1, 2, . . . , n(j).

3. The displacement of the centroid in the j-th snapshot is taken as the average of the differences of the transformed coordinates from step 2:

$$\delta x(r) = \frac{\sum_c \Delta x(r,c)}{n(j)} \text{ and}$$

$$\delta y(r) = \frac{\sum_c \Delta y(r,c)}{n(j)},$$

where $\delta x(r)$ is the x displacement of the centroid in the j-th snapshot and $\delta y(r)$ is the y displacement of the centroid in the j-th snapshot.

4. The differences of the transformed coordinates are adjusted for the centroid displacement:

$$\Delta x'(r,c) = \Delta x(r,c) - \delta x(r)$$

and $$\Delta y'(r,c) = \Delta y(r,c) - \delta y(r).$$

5. A figure of merit for the r-th combination is derived as the root-mean-square of the adjusted differences of the transformed coordinates:

$$\gamma(r) = \sqrt{\frac{\sum_c \Delta x'(r,c)^2 + \sum_c \Delta y'(r,c)^2}{n(j)}}.$$

4. Alternatively, the differences can be normalized to NID (0,1), i.e., normally and independently distributed with a mean of 0 and a standard deviation of 1, by substituting the difference minus the mean of the differences, all divided by the standard deviation. The figure of merit, $\gamma$, is analogous to the well known $\chi^2$ goodness-of-fit test value. When all figures of merit have been calculated for all combinations of the i-th hits, n(i) taken n(j) at a time, the combination corresponding to the lowest figure of merit is taken as the match of the hits in the j-th snapshot to the hits in the i-th snapshot.

The hits of FIG. 4 will be used to demonstrate the method. The following are exemplary position vectors for the hits and centroid using arbitrary units:

| | | |
|---|---|---|
| r(1,1) = 94.67i + 221.08j, | r(2,1) = 108.12i + 225.94j, | r(3,1) = 120.26i + 228.52j, |
| r(1,2) = 164.36i + 186.23j, | r(2,2) = 174.46i + 182.23j; | r(3,2) = 168.24i + 170.96j, |
| r(1,3) = 118.43i + 54.77j, | r(2,3) = 48.46i + 121.47j; | r(3,3) = 139.45i + 43.03j, |
| r(1,4) = 26.56i + 221.08j, | | r(3,4) = 36.04i + 134.71j. | where n=1 for S(N−1), n=2 for S(N), and n=3 for S(N+1).

The positions of the centroids are therefore:

C(1)=101.01i+151.39j; C(2)=110.35i+176.55j; and C(3)=116.00i+144.31j.

The position coordinates of the hits transformed from the system origin to their centroid according to step 1 are:

| | |
|---|---|
| x'(1,1) = 6.335 | y'(1,1) = 69.6925 |
| x'(1,2) = 63.355 | y'(1,2) = 34.8425 |
| x'(1,3) = 17.425 | y'(1,3) = −96.6175 |
| x'(1,4) = −74.445 | y'(1,4) = 7.9175 |
| x'(2,1) = −2.2267 | y'(2,1) = 49.3933 |
| x'(2,2) = 64.1133 | y'(2,2) = 5.6833 |
| x'(2,3) = −61.8867 | y'(2,3) = −55.0767 |
| x'(3,1) = 4.2625 | y'(3,1) = 84.215 |
| x'(3,2) = 52.2425 | y'(3,2) = 26.655 |
| x'(3,3) = 23.4525 | y'(3,3) = −101.275 |
| x'(3,4) = −79.9575 | y'(3,4) = −9.595 |

The differences between the transformed coordinates according to step 2 are:

| | |
|---|---|
| Δx(1,1) = −4.1083 | Δy(1,1) = 20.2992 |
| Δx(1,2) = −0.7583 | Δy(1,2) = 29.1592 |
| Δx(1,3) = 79.3117 | Δy(1,3) = −41.5408 |
| Δx(2,1) = 4.1083 | Δy(2,1) = 20.2992 |
| Δx(2,2) = −0.7583 | Δy(2,2) = 29.1592 |
| Δx(2,3) = −12.5583 | Δy(2,3) = 47.1592 |
| Δx(3,1) = 4.1083 | Δy(3,1) = 20.2992 |
| Δx(3,2) = −46.6883 | Δy(3,2) = −102.3008 |
| Δx(3,3) = −12.5583 | Δy(3,3) = 47.159200 |
| Δx(4,1) = 65.5817 | Δy(4,1) = −14.55080 |
| Δx(4,2) = −46.6883 | Δy(4,2) = −102.3008 |
| Δx(4,3) = −12.5583 | Δy(4,3) = 47.159200 |

The results of step 3, finding the apparent displacement of the centroid in snapshot S(N), are:

| | |
|---|---|
| δx(1) = 24.815 | δy(1) = 2.6392 |
| δx(2) = −5.8083 | δy(2) = 32.2058 |
| δx(3) = −21.1183 | δy(3) = −11.6142 |
| δx(4) = 2.1117 | δy(4) = −23.2308 |

The adjusted transformed coordinates of snapshot S(N) for the centroid displacement according to step 4 are:

| Group 1 | |
|---|---|
| Δx'(1,1) = −28.9233 | Δy'(1,1) = 17.66 |
| Δx'(2,2) = −25.5733 | Δy'(2,2) = 26.52 |
| Δx'(3,3) = 54.4967 | Δy'(3,3) = −44.18 |
| Group 2 | |
| Δx'(1,1) = 17.01 | Δy'(1,1) = 31.9133 |
| Δx'(2,2) = −25.57 | Δy'(2,2) = −90.6867 |
| Δx'(3,4) = 8.56 | Δy'(3,4) = 58.7733 |
| Group 3 | |
| Δx'(1,1) = 63.47 | Δy'(1,1) = 8.68 |
| Δx'(2,3) = 1.7 | Δy'(2,3) = −11.9067 |
| Δx'(3,4) = 5.05 | Δy'(3,4) = −3.0467 |
| Group 4 | |
| ·x'(1,2) = −6.75 | Δy'(1,2) = 14.9533 |
| Δx'(2,3) = −48.8 | Δy'(2,3) = −79.07 |
| Δx'(3,4) = −14.67 | Δy'(3,4) = 70.39 |

The figures-of-merit for each group according to step 5 are:

$\gamma(1) = 43.0914$; $\gamma(2) = 10.5902$; $\gamma(3) = 58.5518$; and $\gamma(4) = 66.9090$.

The value of $\gamma(2)$ is a minimum. The combination of the S(N−1) hits for $\gamma(2)$ (Group 2) was 1, 2, and 4. Therefore, hit 1 of snapshot S(N) corresponds to hit 1 of snapshot S(N−1), hit 2 of snapshot S(N) corresponds to hit 2 of snapshot S(N−1), and hit 3 of snapshot S(N) corresponds to hit 4 of snapshot S(N−1).

The purpose of step 4 in the procedure is to adjust the transformed coordinates for an apparent displacement in the centroid from the i-th snapshot to the j-th snapshot. This has the effect of removing the bias of the centroid displacement between the two snapshots under consideration.

A second situation occurs as shown from S(N) to S(N+1). The number of hits in snapshot is greater than in the preceding snapshot, S(N). When the number of hits in the snapshot S(N+1) is greater than the number of hits in the snapshot S(N), a look-back procedure is implemented. That is, the number of hits in the snapshot S(N−1) is checked and if the number of hits n(N−1) is greater than n(N), then the algorithm is also applied to scans S(N−1) and S(N+1). If the best of these combinations is better than the threshold, then the S(N−1) to S(N+1) assignments replace the S(N) to S(N+1) assignments. In general, where adjacent scans (such as S(N−1) and S(N) or S(N) and S(N+1)) have differing numbers of hits and the subsequent scan has fewer, it is useful to extend the technique of the invention to alternate adjacent scans. In the example, S(N−1) and S(N+1) are alternate adjacent scans. If using alternate adjacent scans affords better figures of merit, then the intermediate scan (S(N)) can be bypassed. This provides continuity of tracking for the hits missing in the intermediate scan.

The procedure for matching the hits in snapshot S(N+1) with those in snapshot S(N) is the same as the steps set forth above with the difference being that the adjusted trans formed coordinates of the no) hits of S(N+1) are subtracted from the adjusted transformed coordinates of the n(i) hits of the S(N) snapshot. (The convention that j>i is maintained from snapshot to snapshot.)

Since n(j)>n(i), the $$\binom{n(i)}{n(j)}$$

combinations of n(i) hits at a time from snapshot j are used.

The results from steps 1 and 2, i.e., the transformed coordinates and differences, are the same as shown above. The centroid displacements are different, however.

| | |
|---|---|
| δx(1) = −25.9103 | δy(1) = −19.6628 |
| δx(2) = 8.5597 | δy(2) = −50.2228 |
| δx(3) = 18.1564 | δy(3) = −7.5794 |
| δx(4) = 2.1631 | δy(4) = 11.6072 |

The adjusted transformed coordinates from step 4 using the new centroid displacements are:

| Group 1 | |
|---|---|
| Δx'(1,2) = 85.7611 | Δy'(1,1) = −58.8689 |
| Δx'(2,2) = −88.2189 | Δy'(2,2) = −62.0689 |
| Δx'(3,3 ) = 2.4578 | Δy'(3,3) = 120.9378 |
| Group 2 | |
| Δx'(1,1) = 51.2911 | Δy'(1,1) = −28.3089 |
| Δx'(2,2) = −122.6889 | Δy'(2,2) = −31.5089 |
| Δx'(3,4) = 71.3978 | Δy'(3,4) = 59.8178 |
| Group 3 | |
| Δx'(1,1) = 41.6944 | Δy'(1,1) = −70.9522 |
| Δx'(2,3) = −103.4956 | Δy'(2,3) = 53.7778 |
| Δx'(3,4) = 61.8011 | Δy'(3,4) = 17.1744 |
| Group 4 | |
| Δx'(1,2) = 9.7078 | Δy'(1,2) = −32.5789 |
| Δx'(2,3) = −87.5022 | ·y'(2,3) = 34.5911 |
| Δx'(3,4) = 77.7944 | Δy'(3,4) = −2.0122 |

The figures of merit for each group are:
$\gamma(1) = 111.1870$; $\gamma(2) = 96.8734$; $\gamma(3) = 90.351853$; and $\gamma(4) = 73.1775$.

Since $\gamma(4)$ is the smallest, the 2, 3, and 4 combination of the hits in S(N+1) are assigned the identification numbers 1, 2, and 3. That is, P(2,1)→P(3,2), P(2,2)→P(3,3), and P(2, 4)→P(2,3). The reassignment of the identification numbers in S(N) previously described may be carried over and can be handled in several ways, e.g., maintaining tables of indices versus identification numbers.

A figure of merit should not exceed some fixed threshold. This threshold would be a data base value which initially would be set to the root-sum-of-squares divided by the number of pairs in the combination, e.g., 3.5 times the centroid error and the maximum relative motion of one hit relative to another from snapshot to snapshot. The threshold value would be adjusted from there to give optimal results using high fidelity simulations or real data. If the figure of merit is exceeded, the correlation would be flagged as above the threshold.

While the invention has been particularly shown and described with reference to a preferred embodiment thereof, it will be understood by those skilled in the art that various changes and modifications in form and details may be made

What is claimed is:

1. A method of tracking closely clustered objects comprising the steps of
determining a fist set of locations of objects in a cluster according to a coordinate system;
assigning object identifiers to each object in the cluster according to its first set location;
determining a second set of locations of the objects in the cluster according to the coordinate system, the second set of locations being subsequent in time to the first;
assigning object identifiers to each object in the cluster according to its second set location; and
correlating the object identifiers in the second set of locations with object identifiers in the first set of locations including a step of adjusting locations of the objects in the first set locations and in the second set locations to conform to a modified origin of the coordinate system.

2. The method of claim 1 wherein the modified origin of the coordinate system is a centroid of locations in the set.

3. The method of claim 2 wherein the correlating step further includes the steps of:
taking all possible pairs of locations between the first and second sets of adjusted locations;
determining the differences between all the possible pairs;
calculating the displacement of the centroid of the second set of location as an average of the differences; and
transforming the adjusted locations of the second set to coordinates having as an origin the displacement of their centroid.

4. The method of claim 3 including the further steps of:
computing a figure of merit according to a root-mean-square value of the transformed locations; and
selecting from all possible pairs those pairs having the lowest value of the figure-of-merit as matching locations.

5. A method of identifying individual objects within a plurality of objects appearing in close proximity to one another in successive varying patterns comprising the steps of:
assigning coordinates of individual objects in successive patterns;
transforming the coordinates of objects in each pattern to a centroid of each pattern's coordinates into transformed coordinates;
calculating sets of all possible pairwise differences among transformed coordinates of objects in first and second successive patterns, each pair comprising a coordinate from a different pattern;
determining a displacement of the centroid of a second of two successive patterns;
adjusting the differences from the calculating steps according to the displacement found in the determining step; and
deriving a figure of merit for adjusted differences
whereby the figure of merit provides a basis for selecting a pairwise set identifying the corresponding objects in successive patterns.

6. The method of claim 5 wherein the displacement of the determining step is taken as the average of the pairwise differences.

7. The method of claim 5 wherein the adjusting step includes subtracting the displacement in the determining step from the differences in the calculating step.

8. The method of claim 5 wherein the deriving step is taken as the root-mean-square of adjusted differences.

9. The method of claim 8 wherein the deriving step is taken as the root-mean-square of the adjusted differences divided by the number of objects in a successive pattern.

10. The method of claim 5 wherein the calculating step calculates sets of all possible pairwise differences among transformed coordinates of objects in first and third successive patterns, each pair comprising a coordinate from a different pattern when there are fewer objects in the second successive pattern than in the first successive pattern and includes the further step of comparing the figures of merit between first and second successive patterns to the figures of merit between first and third successive patterns whereby the figures of merit showing the best correlation are used to identify the corresponding objects in successive patterns.

11. A method of ascertaining continuity of tracking of closely clustered objects between successive observations comprising the steps of:
relocating indicia of tracked objects with respect to a centroid of positions in each scan;
computing the differences of positions between pairs of objects in adjacent scans;
adjusting the differences to a rectified centroid of positions in a second one of adjacent scans; and
determining a goodness of fit measure from the adjusted differences.

12. The method of claim 11 including a further step of rectifying the centroid of a second one of adjacent scans according to an average of the differences from the computing step.

13. The method of claim 11 wherein the indicia are vector coordinates of position.

14. The method of claim 11 including the steps of:
repeating the steps for alternate adjacent scans if the second one of adjacent scans has fewer objects than the first one of adjacent scans; and
substituting the goodness of fit measure from the repeated steps when the latter indicate a better match.

* * * * *